United States Patent
Takagi et al.

(10) Patent No.: US 7,448,658 B2
(45) Date of Patent: Nov. 11, 2008

(54) BUMPER BEAM FOR VEHICLE

(75) Inventors: Katsutoshi Takagi, Toyota (JP); Mitsutoshi Kano, Toyota (JP)

(73) Assignee: Toyoda Iron Works Co., Ltd., Toyota-shi, Aichi-ken (JP)

(*) Notice: Subject to any disclaimer, the term of this patent is extended or adjusted under 35 U.S.C. 154(b) by 309 days.

(21) Appl. No.: 11/204,045

(22) Filed: Aug. 16, 2005

(65) Prior Publication Data

US 2007/0024069 A1    Feb. 1, 2007

(30) Foreign Application Priority Data

Aug. 1, 2005    (JP) .............................. 2005-223281

(51) Int. Cl.
*B60R 19/02* (2006.01)

(52) U.S. Cl. ....................... 293/102; 293/154

(58) Field of Classification Search .............. 293/162, 293/133, 154, 121, 102; 296/187.09, 203.02
See application file for complete search history.

(56) References Cited

U.S. PATENT DOCUMENTS

| | | | |
|---|---|---|---|
| 5,916,389 A | | 6/1999 | Lundstrom |
| 6,779,821 B2 * | | 8/2004 | Hallergren ................. 293/133 |
| 2005/0029821 A1 * | | 2/2005 | Evans ......................... 293/133 |
| 2006/0001277 A1 * | | 1/2006 | Mellis et al. ................. 293/121 |
| 2006/0130940 A1 * | | 6/2006 | Kollaritsch et al. ......... 148/518 |
| 2006/0290150 A1 * | | 12/2006 | Roll et al. ................... 293/133 |
| 2007/0176438 A1 * | | 8/2007 | Tornberg .................... 293/102 |

FOREIGN PATENT DOCUMENTS

| | | |
|---|---|---|
| FR | 2 756 524 | 6/1998 |
| JP | 09-095189 | 4/1997 |
| JP | 2003-146159 | 5/2003 |
| JP | 2005-074468 | 3/2005 |
| WO | WO 00/17017 | 3/2000 |
| WO | WO 00/35610 | 6/2000 |

* cited by examiner

*Primary Examiner*—Jason S Morrow
(74) *Attorney, Agent, or Firm*—Finnegan, Henderson, Farabow, Garrett & Dunner, LLP.

(57) ABSTRACT

A vehicle bumper beam, attached at its ends to side members of a vehicle through respective impact absorbing members. The bumper beam is press-formed into a predetermined shape. A width W2 of a connecting portion at an end portion thereof is larger than a width W1 of a connecting portion at a center portion thereof. A height H1 of a protruding portion at an end portion thereof is smaller than a height H2 of a protruding portion at a center portion thereof. A connecting portion between the protruding portions cooperates with the protruding portions to define an M-shaped configuration. The opposite end portions have a bending strength higher than a crush strength of the impact absorbing members.

10 Claims, 3 Drawing Sheets

BUMPER BEAM FOR VEHICLE

This application is based on Japanese Patent Application No. 2005-223281, the content of which is incorporated hereinto by reference.

BACKGROUND OF THE INVENTION

1. Field of the Invention

The present invention relates to a vehicle bumper beam, and more particularly to such a vehicle bumper beam capable of maintaining a required strength thereof while providing an impact absorbing member with a crush stroke that is large enough to absorb an impact energy.

2. Discussion of Prior Art

There is widely used a vehicle bumper beam which has an elongated shape and which is to be attached at its longitudinally opposite end portions to respective side members of a vehicle through respective impact absorbing members (see JP-H09-95189A). As an example of such a bumper beam, a bumper beam 10 is shown in FIG. 3 that is a schematic plan view showing a front portion of a vehicle as seen from an upper side of the vehicle. In front end portions of respective right and left side members 12R and 12L, there are disposed crush boxes 14R and 14L as impact absorbing members, respectively. The bumper beam 10 is fixed at its right and left end portions to the respective crush boxes 14R, 14L. FIG. 4 is a cross sectional view taken along line 4-4 of FIG. 3, i.e., a cross sectional view of a vicinity of the right-side attached portion of the bumper beam 10. The bumper beam 10 has a hat shape in its cross section, and the crush box 14R is introduced inside the hat shape so as to be integrally fixed to the bumper beam 10. The bumper beam 10 is symmetrical so that the left-side attached portion is constituted similarly as the right-side attached portion. This bumper beam 10 functions as a reinforcement (reinforcing member) of a bumper and also as an attached member, and is integrally attached to a bumper body 16 formed of synthetic resin or the like. Each of the crash boxes 14R, 14L is provided by a cylindrical member, and is crushed like an accordion upon application of impact thereto in a direction from the vehicle front to the rear, so as to absorb the impact energy for thereby alleviating the impact applied to structural members of the vehicle such as the side members 12R, 12L.

Meanwhile, it is proposed, in JP-2003-146159A, a vehicle bumper beam is formed of a tube material (pipe) that is subjected to a hydroforming, such that the bumper beam has in its central portion a B-shaped cross-sectional configuration providing a high rigidity (strength), and such that its height (a distance by which the bumper beam protrudes forwardly of the vehicle) is reduced as viewed in a direction toward each of its opposite end portions, for thereby restraining squareness of corner portions of the vehicle. In the vehicle bumper beam, although a large bending strength is required in its central portion distant from the opposite end attached portions at which the bumper beam is attached to the impact absorbing members, a strength required in its opposite end portions close to the attached portions is relatively small. Thus, in each of the opposite end portions of the bumper beam, the height may be reduced.

The above-described vehicle bumper beam described in FIGS. 3 and 4 of JP-H09-95189A can be inexpensively manufactured by using a flat-sheet-shaped metallic material, which is subjected to a press working or the like. However, since the bumper beam has a simple hat-like shape in its cross section, the thickness of the sheet has to be increased in order to enable the bumper beam to have a required bending strength (rigidity), thereby resulting in increase in a weight of the bumper beam. Further, the arrangement in which the impact absorbing member (crush box) is introduced inside the hat shape to be integrally fixed to the bumper beam, leads to reduction in a spacing distance D (see FIG. 4) by which the bumper beam is to be moved until it is brought into contact with the side members or other structural members (an adapter plate 64 in FIG. 4), thereby making it impossible to provide a crush stroke required for the crush box to be completely crushed, and causing a possibility that an expected impact-absorbing performance could not be obtained.

On the other hand, in the vehicle bumper beam disclosed in JP-2003-146159A, an excellent bending strength can be obtained, and a sufficient crush stroke is easily obtained owing to the reduction in the height in the opposite end portions. However, the use of the pipe leads to increase in the manufacturing cost. Although it might be possible for a flat-sheet-shaped metallic material to be bent to have a closed cross section, this complicates the manufacturing process, not necessarily leading to sufficient reduction in the manufacturing cost.

Further, it might be possible for a flat-sheet-shaped metallic material to have a M shape in its cross section as a bumper beam 20 shown in FIG. 5, for example, by roll forming or extrusion forming. In this case, the M shape has a higher strength than the hat shape, thereby making it possible to reduce the weight by reducing the thickness of the sheet or reducing the height. Further, it would be possible to manufacture it at a cost lower than the bumper beam of the closed cross section. However, in the bumper beam formed by the roll forming or extrusion forming, since the cross-sectional configuration is constant, the height is made large also in the attached portions at which the bumper beam is attached to the crush boxes, so that the length L of the crush boxes is reduced due to the large height in the attached portions of the bumper beam. The reduction in the length L of the crush boxes reduces the impact-absorbing performance. It is noted that FIG. 5 is a cross sectional view corresponding to FIG. 4.

The present invention was made in the light of the background art discussed above. It is therefore an object of the invention to provide a light-weighted and inexpensive vehicle bumper beam capable of maintaining a required bending strength thereof while assuring a sufficient crush stroke.

SUMMARY OF THE INVENTION

For achieving the above object, the first invention is, in a vehicle bumper beam which has an elongated shape and which is to be attached at longitudinally opposite end portions thereof to respective side members of a vehicle through respective impact absorbing members, characterized in that: (a) the bumper beam is formed of a flat-sheet-shaped metallic material, which is subjected to a press working to have a predetermined shape; (b) a pair of protruding portions, each protruding to have an inverted U shape, are provided to be vertically spaced apart from each other, with a connecting portion being interposed therebetween in a longitudinally central portion of the bumper beam, such that the longitudinally central portion has a M-shaped cross-sectional configuration as a whole; (c) a width W2 of the connecting portion is larger in the longitudinally opposite end portions as attached portions at which the bumper beam is attached to the side members, than a width W1 of the connecting portion in the longitudinally central portion, while a height H2 of the protruding portions is smaller in the longitudinally opposite end portions as the attached portions, than a height H1 of the protruding portions in the longitudinally central portion, by a range allowing the longitudinally opposite end portions to have a bending strength higher than a crush strength of the impact absorbing members, such that each of the longitudinally opposite end portions has a flat M-shaped cross-sectional configuration as a whole; and (d) the width of the connecting portion is gradually increased as viewed in a direction away from the longitudinally central portion toward each of the attached portions, while the height of the protruding portions is gradually reduced as viewed in the direction away from the longitudinally central portion toward each of the attached portions.

The second invention is, in a vehicle bumper beam which has an elongated shape and which is to be attached at longitudinally opposite end portions thereof to respective side members of a vehicle through respective impact absorbing members, characterized in that: (a) the bumper beam is formed of a flat-sheet-shaped metallic material, which is subjected to a press working to have a predetermined shape; (b) a pair of protruding portions, each protruding to have an inverted U shape, are provided to be vertically spaced apart from each other, with a connecting portion being interposed therebetween in a longitudinally central portion of the bumper beam, such that the longitudinally central portion has a M-shaped cross-sectional configuration as a whole; (c) a height H of the protruding portions is gradually reduced as viewed in a direction away from the longitudinally central portion toward each of the longitudinally opposite end portions, while the connecting portion is gradually displaced in a direction of protrusion of the protruding portions as viewed in the direction away from the longitudinally central portion toward each of the longitudinally opposite end portions; and (d) the connecting portion is displaced to a position of the protruding portions so as to be flush with the protruding portions in the longitudinally opposite end portions as attached portions at which the bumper beam is attached to the side members, such that each of the longitudinally opposite end portions has an inverted plate-shaped cross-sectional configuration as a whole, inside which a corresponding one of the impact absorbing members is introduced so as to be fixed to each of the longitudinally opposite end portions, the inverted plate-shaped cross-sectional configuration having a height h enabling the longitudinally opposite end portions to have a bending strength higher than a crush strength of the impact absorbing members, while allowing the impact absorbing members to be completely crushed.

The third invention is, in the vehicle bumper beam of the first or second invention, characterized in that a tensile strength of the metallic material is not lower than 780 MPa.

The fourth invention is, in the vehicle bumper beam of the first or second invention, characterized in that the press working is a hot press forming that is carried out by heating the metallic material to a high temperature, such that a formed product has an increased strength by the hot press forming.

EFFECT OF THE INVENTION

Since the vehicle bumper beam of the first invention is the to the press working to have the predetermined shape, it can be manufactured relatively inexpensively, as compared with a case where a pipe is used or where a sheet material is formed into a closed cross-sectional configuration. Meanwhile, in its longitudinally central portion in which a high bending strength is required, the pair of protruding portions are connected to each other through the connecting portion, so that the central portion has the M-shaped cross-sectional configuration, so as to be given a higher bending strength than a hat shape, thereby making it possible to reduce a weight of the bumper beam, by reducing the sheet thickness and the height H1.

Further, the width W2 of the connecting portion is made larger in the attached portions at which the bumper beam is attached to the impact absorbing members, than the width W1 of the connecting portion in the central portion. Meanwhile, the height H2 of the protruding portions is smaller in the attached portions, than the height H1 of the protruding portions in the longitudinally central portion, by the range allowing the attached portions to have the bending strength higher than the crush strength of the impact absorbing members, such that each of the attached portions has a flat M-shaped cross-sectional configuration as a whole. It is therefore possible to reduce the height H2 while assuring the required bending strength. The reduction of the height H2 enables the length of the impact absorbing members to be increased, thereby making it possible to obtain a sufficient impact-absorbing performance. In that case, since the width of the connecting portion and the height of the protruding portions are smoothly and gradually changed, there is no risk of deterioration of the bending strength due to a stress concentration.

Since the vehicle bumper beam of the second invention is also the product formed of the flat-sheet-shaped metallic material that is subjected to the press working to have the predetermined shape, it can be also manufactured relatively inexpensively, as compared with a case where a pipe is used or where a sheet material is formed into a closed cross-sectional configuration. Meanwhile, in its longitudinally central portion in which a high bending strength is required, the pair of protruding portions are connected to each other through the connecting portion, so that the central portion has the M-shaped cross-sectional configuration, so as to be given a higher bending strength than a hat shape, thereby making it possible to reduce a weight of the bumper beam, by reducing the sheet thickness and the height H.

Further, each of the attached portions at which the bumper beam is fixed to the impact absorbing members is configured to have the inverted plate-shaped cross-sectional configuration inside which a corresponding one of the impact absorbing members is introduced so as to be fixed to each of the attached portions. The height h of the inverted plate-shaped cross-sectional configuration is a dimension enabling the attached portions to have the bending strength higher than the crush strength of the impact absorbing members while allowing the impact absorbing members to be completely crushed, so that the attached portions maintain the required bending strength while assuring the sufficiently crush stroke of the impact absorbing members, thereby making it possible to obtain a sufficient impact-absorbing performance. In that case, the height of the protruding portions is gradually reduced as viewed in the direction away from the central portion toward each of the opposite end portions, and the connecting portion is gradually displaced in the direction of the protrusion of the protruding portions as viewed in the direction away from the central portion toward each of the opposite end portions, thereby eliminating a risk of deterioration of the bending strength due to a stress concentration.

In either of the third invention in which the tensile strength of the metallic material is not lower than 780 MPa and the fourth invention in which the metallic material is given the strength increased by the hot press forming, it is possible to increase a degree of freedom in designing the configuration while assuring the required bending strength. Owing to the increased degree of freedom in designing the configuration, the weight of the bumper beam can be further reduced by reducing the height values H1, H2, h or reducing the sheet thickness. Further, the increased degree of freedom permits the roundness of the corner portions of the vehicle to be increased while maintaining the impact-absorbing performance, or permits the length of the impact-absorbing members to be increased for further improving the impact-absorbing performance.

Although the vehicle bumper beam of the present invention is applicable to the bumper attached to a front portion of the vehicle and also to the bumper attached to a rear portion of the vehicle, it may be applied to only one of the bumpers attached to the front and rear portions of the vehicle.

In a configuration of the bumper beam in its longitudinal direction, namely, in a configuration of the bumper beam in a plan view as seen from an upper side of the vehicle, where the bumper beam is attached to the front bumper, for example, it is preferable that the bumper beam is smoothly curved such that the central portion forwardly protrudes. However, it is possible to adopt any one of various modes, for example, such that the bumper beam extends substantially straight, or such that only the opposite end portions of the bumper beam are rearwardly inclined or curved.

Any one of the above-described cross-sectional configurations, such as the M-shaped cross-sectional configuration in the longitudinally central portion, and the flat M-shaped cross-sectional configuration and the inverted plate-shaped cross-sectional configuration in the attached portions, is a shape in a cross section which is perpendicular to the longitudinal direction of the bumper beam, namely, in a cross section extending in a vertical direction of the vehicle. The inverted plate-shaped cross section is interpreted to mean that a plate-shaped bottom portion protrudes outwardly of the vehicle, namely, protrudes forwardly or rearwardly of the vehicle. Each of the inverted U-shaped protruding portions of the M-shaped cross-sectional configuration is interpreted to mean that a U-shaped bent portion protrudes outwardly of the vehicle, namely, protrudes forwardly or rearwardly of the vehicle.

The bent portion of the above-described M-shaped cross-sectional configuration, inverted plate-shaped cross-sectional configuration or inverted U-shaped protruding portions may be roundly curved in an arcuate manner, or alternatively may be right-angled or otherwise squared. The squared U shape may be rectangular or trapezoid. Further, the connecting portion connecting the pair of protruding portions may take any one of various forms. At least in the attached portions at which the bumper beam is attached to the impact absorbing members, the connecting portion connecting the pair of protruding portions is provided by a flat surface. However, in the longitudinally central portion, the connecting portion may be curved in arcuate manner. In opposite end portions of the M-shaped cross-sectional configuration or inverted plate-shaped cross-sectional configuration, namely, in vertically opposite end portions of the bumper beam having the elongated shape, a flat flange may be provided as needed.

Each of the impact absorbing members has a function of alleviating the impact against the vehicle structural members such as the side member, and is constituted by a metallic plate member taking the form of a tubular shape such as cylindrical or angular tubular shape. Each impact absorbing member is preferably provided by a crush box, which is arranged to be crushed like an accordion when being compressed by an impact energy acting thereon in its axial direction, so as to absorb the impact energy. However, each impact absorbing member may be provided by other kinds of members including an elastic body such as rubber, spring and compressed air, too.

In the first invention, the width $W2$ of the connecting portion in the attached portions is, for example, a value equal to a width of the adapter plates of the impact absorbing members, or a value smaller than the width of the adapter plates (which value can assure a space required for attaching the bumper beam to the impact absorbing members). However, the width $W2$ of the connecting portion may be also a value larger than the width of the adapter plates. It is noted that the impact absorbing members do not necessarily have to be equipped with the respective adapter plates and that the attached portions adapted to be flat may be directly attached to the respective impact absorbing members without the adapter plates.

In the second invention, a width of inside of the inverted plate-shaped cross-sectional configuration in each of the attached portions is made larger than the width of the adapter plate or other component of each of the impact absorbing members so that each impact absorbing member can be introduced to be brought into close contact with a plate-shaped bottom portion of each attached portion. The height h of the inverted plate-shaped cross-sectional configuration is determined such that a spacing distance between the bumper beam and structural members such as the side members is made larger than a crush stroke that is required for the impact absorbing members to be completely crushed before the bumper beam is brought into contact with the structural members. The crush stroke enabling the impact absorbing members to be completely crushed is, where each of the impact absorbing members is provided by the crush box, 70-75% of the length of the crush box, although it varies depending on the material and sheet thickness of the crush box. It is enough that the height h is set a value that permits the crush box to be introduced inside the inverted plate-shaped cross-sectional configuration by a distance smaller than 20% of the total length of the crush box. However, in order to assure the bending strength, it is preferable that the value of the height h is determined such that the above-described distance is smaller than 25%.

Where the tensile strength of the metallic material is not lower than 780 MPa, as in the third invention, the metallic material can be usually formed by a cold press forming. Where the metallic material is formed and given the increased strength by the hot press forming that is carried out with the metallic material being heated, as in the fourth invention, it is possible to increase the tensile strength to, for example, about 1400 MPa or more, leading to a remarkable improvement in the bending strength. A metallic material used for such a hot press forming to be given an increased strength is disclosed, for example, in JP-2005-74468A.

DETAILED DESCRIPTION OF THE INVENTION

Embodiment 1

Figure 1A:
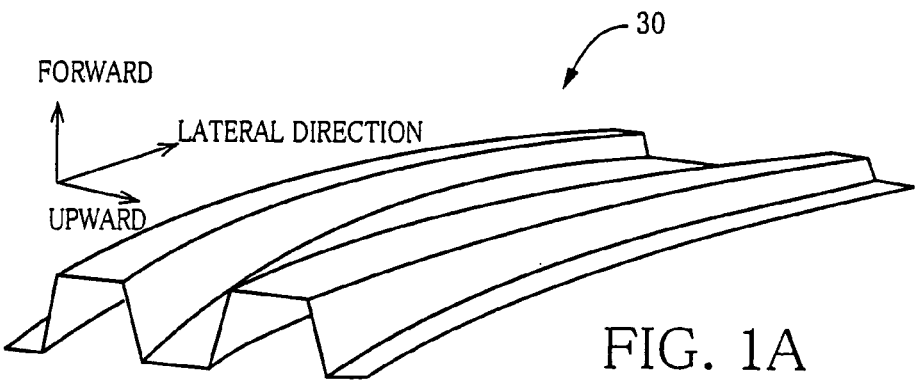
FIG. 1A is a perspective view of a vehicle bumper beam according to an embodiment of the invention, showing a right half of the bumper beam.
Figure 1B:
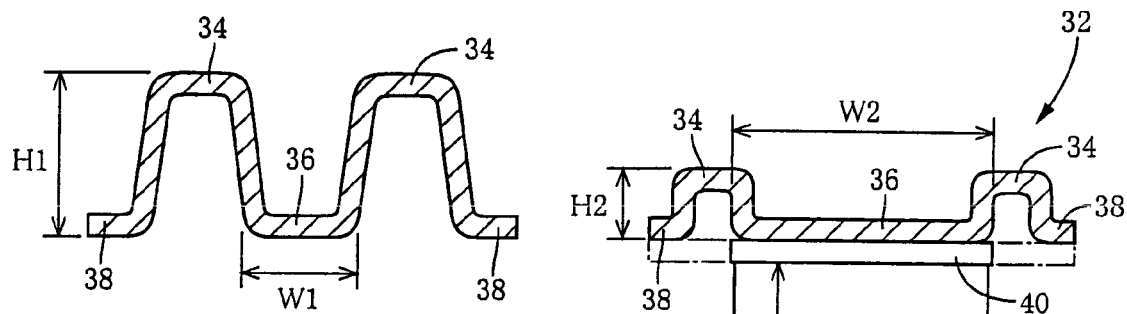
FIG. 1B is a cross sectional view of a central portion of the vehicle bumper beam of FIG. 1A.
Figure 1C:
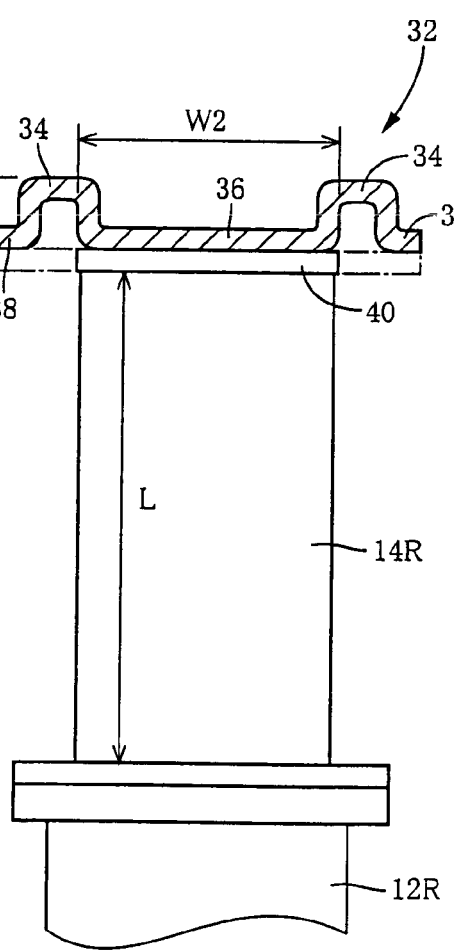
FIG. 1C is a cross sectional view in vicinity of an attached portion that is an end portion of the vehicle bumper beam of FIG. 1A.

There will be described in detail an embodiment of the first invention, with reference to the drawings. A vehicle bumper beam 30 of FIGS. 1A-1C is to be disposed in a front portion of a vehicle in the same manner as in the above-described FIG. 3. FIG. 1A is a perspective view showing a right half of the bumper beam 30, i.e., a longitudinally central portion and a right-handed portion of the bumper beam 30. FIG. 1B is a cross sectional view of the central portion of the bumper beam 30. FIG. 1C is a cross sectional view corresponding to the above-described FIG. 4 and showing the vicinity of one of attached portions 32 that is fixed to the above-described crush box 14R. This bumper beam 30 is formed of a flat-sheet-shaped metallic material which has a tensile strength of 780 MPa or higher, for example, 980 MPa or higher and which is formed by a cold press forming to have a predetermined shape, or alternatively, formed of a flat-sheet-shaped metallic material for a hot press forming, which is formed to have a predetermined shape while being given an increased tensile strength of 1400 MPa or higher by the hot press forming. The bumper beam 30 is provided by an elongated member, and is integrally attached at its longitudinally opposite end portions to the right and left side members 12R, 12L through the respective crush boxes 14R, 14L, in the same manner as in FIG. 3. It is noted that the view of FIG. 1A shows an outline of the shape of the bumper beam 30 and that a thickness of the flat-sheet-shaped metallic material is not illustrated.

In the longitudinally central portion of the bumper beam 30, as is apparent from FIG. 1B, a pair of protruding portions 34 each protruding to have an inverted U shape are provided to be vertically spaced apart from each other, with a connecting portion 36 interposed between the pair of protruding portions 34, such that the longitudinally central portion as a whole has a M-shaped cross-sectional configuration. Vertically opposite end portions of the bumper beam 30 are provided by flat flanges 38 that are located on opposite sides of the pair of protruding portions 34. Each bent portion of the M-shaped cross section is bent to be relatively squared. Each of the pair of protruding portions 34 has a trapezoidal shape such that its width is reduced as viewed in a direction toward its distal end. The connecting portion 36 is straight, namely, provides a flat surface, and lies on a plane on which the flanges 38 also lie. The bumper beam 30 is disposed in the front portion of the vehicle such that the connecting portion 36 and the flanges 38 have substantially vertical attitudes. A horizontal direction in FIG. 1B corresponds to a vertical direction of the bumper beam 30 (or vehicle), and an upward direction in FIG. 1B corresponds to a forward direction of the vehicle.

In the attached portion 32 shown in FIG. 1C, a width W2 of the connecting portion 36 is larger than a width W1 of the connecting portion 36 in the above-described central portion, while a height H2 of each of the protruding portions 34 is smaller than a height H1 of each of the protruding portions 34 in the central portion by a range allowing the attached portion 32 to have a bending strength higher than a crush strength of the crush box 14R, such that the attached portion 32 as a whole has a flat M-shaped cross-sectional configuration. The width W2 of the connecting portion 36 is substantially equal to a width of an adapter plate 40 of the crush box 40. The connecting portion 36 has a flat surface, and is integrally fixed to the adapter plate 40 by means of bolts or the like (not shown), with the flat surface is held in close contact with substantially an entire surface of the adapter plate 40. It is noted that the adapter plate 40 may be adapted to further extend, as indicated by one-dot chain line, to have substantially the same width as that of the bumper beam 30, so that the flanges 38 as well as the connecting portion 36 are attached to the adapter plate 40.

The width W of the connecting portion 36 is gradually increased as viewed in a direction away from the central portion shown in FIG. 1B toward each of the attached portions 32, while the height H of the protruding portions 34 is gradually reduced as viewed in the direction away from the central portion shown in FIG. 1B toward each of the attached portions 32. The width of the entirety of the bumper beam 30 in each of the attached portions 32, namely, a dimension of the entirety of the bumper beam 30 as measured in a horizontal direction of FIG. 1C is substantially equal to the width of the entirety of the bumper beam 30 in the central portion shown in FIG. 1B. In a state in which the metallic material is flat before being subjected to the press working, the metallic material has a width which is maximized in its central portion and which is gradually reduced as viewed in the direction away from its central portion toward each of its opposite end portions.

Since the vehicle bumper beam 30 of the first invention is a product formed of the flat-sheet-shaped metallic material that is subjected to the press working to have the predetermined shape, it can be manufactured relatively inexpensively, as compared with a case where a pipe is used or where a sheet material is formed into a closed cross-sectional configuration. Meanwhile, in its longitudinally central portion in which a high bending strength is required, the pair of protruding portions 34 are connected to each other through the connecting portion 36, so that the central portion has the M-shaped cross-sectional configuration, so as to be given a higher bending strength than a hat shape, thereby making it possible to reduce a weight of the bumper beam, by reducing the sheet thickness and the height H1.

Further, the width W2 of the connecting portion 36 is made larger in the attached portion 32 at which the bumper beam 30 is attached to the crush box 14R, than the width W1 of the connecting portion 36 in the central portion. Meanwhile, the height H2 of the protruding portions 34 is smaller in the attached portion 32, than the height H1 of the protruding portions 34 in the longitudinally central portion, by the range allowing the attached portion 32 to have the bending strength higher than the crush strength of the crush box 14R, such that the attached portion 32 as a whole has a flat M-shaped cross-sectional configuration. It is therefore possible to reduce the height H2 while assuring the required bending strength. The reduction of the height H2 enables the length of the crush box 14R to be increased, thereby making it possible to obtain a sufficient impact-absorbing performance. In that case, since the width W of the connecting portion 36 and the height H of the protruding portions 34 are smoothly and gradually changed, there is no risk of deterioration of the bending strength due to a stress concentration.

Further, in the present embodiment, the bumper beam 30 is formed of the flat-sheet-shaped metallic material which has the tensile strength of 980 MPa or higher and which is formed by the cold press forming, or alternatively, formed of the flat-sheet-shaped metallic material for the hot press forming, which is formed while being given an increased tensile strength of 1400 MPa or higher by the hot press forming. In either case, it is possible to increase a degree of freedom in designing the configuration while assuring the required bending strength. Owing to the increased degree of freedom in designing the configuration, the weight of the bumper beam can be further reduced by reducing the height values H1, H2 or reducing the sheet thickness. Further, the increased degree of freedom permits the roundness of the corner portions of the vehicle to be increased by rearwardly shifting the end portions of the bumper beam 30 toward the rear portion of the vehicle, while maintaining the impact-absorbing performance. The increased degree of freedom also permits the length L of the crush box 14R to be increased for further improving the impact-absorbing performance. This effect is further remarkable where the bumper beam 30 is formed of the metallic material for the hot press forming, whose strength is increased by the hot press forming.

Embodiment 2

There will be described in detail an embodiment of the second invention, with reference to the drawings.

Figure 2A:
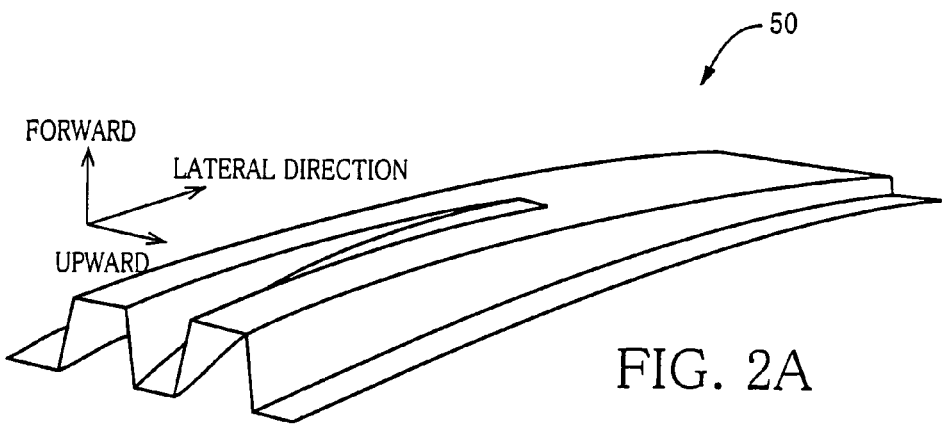
FIG. 2A is a view corresponding to the view of FIG. 1A, and showing a vehicle bumper beam according to another embodiment of the invention.
Figure 2B:
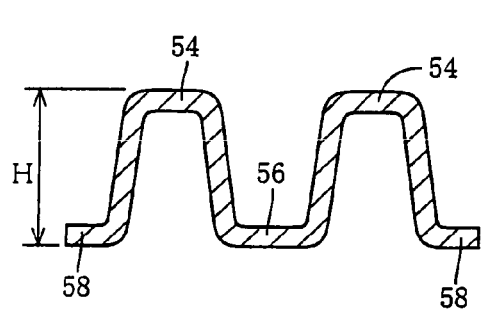
FIG. 2B is a view corresponding to the view of FIG. 1B, and showing the vehicle bumper beam of FIG. 2A.
Figure 2C:
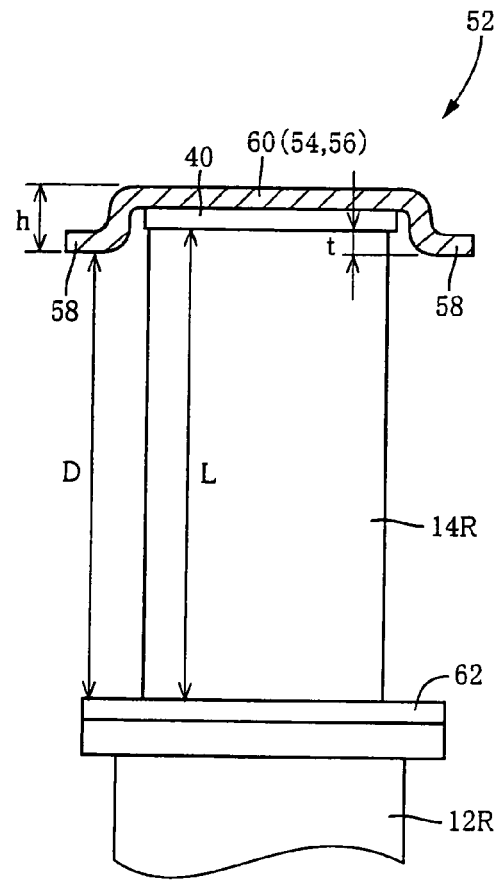
FIG. 2C is a view corresponding to the view of FIG. 1C, and showing the vehicle bumper beam of FIG. 2A.
Figure 3:
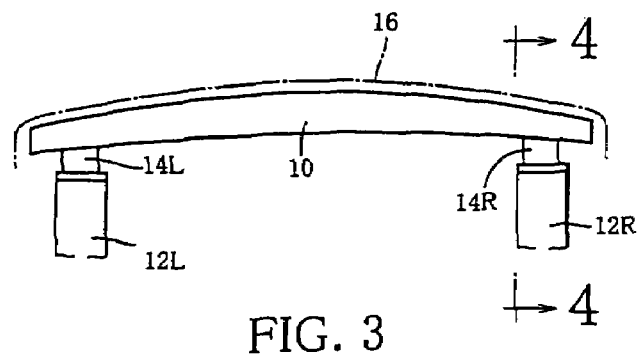
FIG. 3 is a schematic plan view showing a state in which a conventional vehicle bumper beam is attached to front ends of respective right and left side members through respective impact absorbing members.
Figure 4:
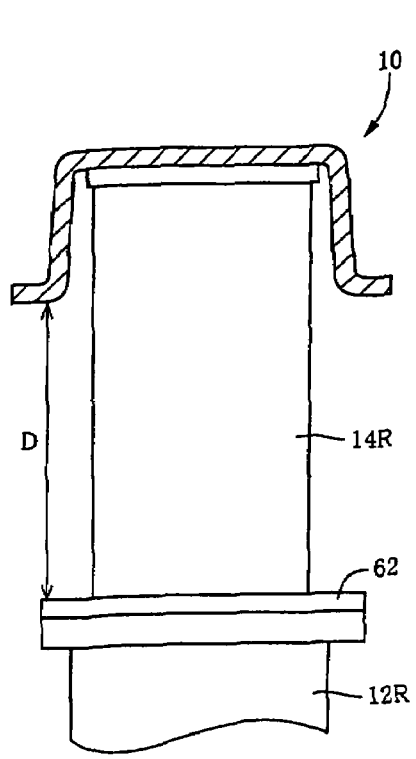
FIG. 4 is a cross sectional view taken in line 4-4 in FIG. 3.
Figure 5:
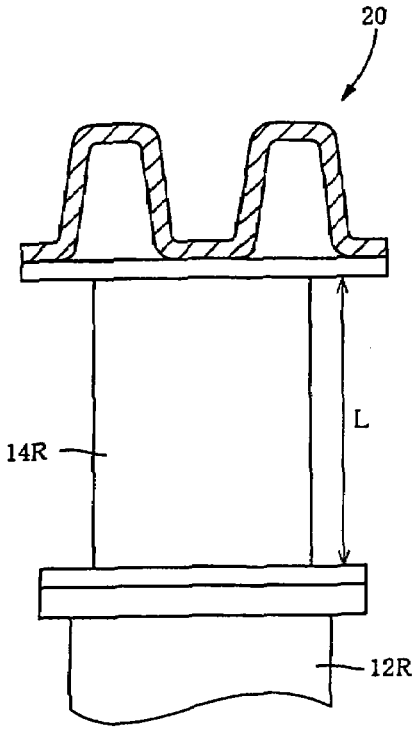
FIG. 5 is a view corresponding to the view of FIG. 4, and showing another example of the vehicle bumper beam.

A vehicle bumper beam 50 of FIGS. 2A-2C is to be disposed in a front portion of a vehicle in the same manner as in the above-described FIG. 3. FIG. 2A is a perspective view showing a right half of the bumper beam 50, i.e., a longitudinally central portion and a right-handed portion of the bumper beam 50. FIG. 2B is a cross sectional view of the central portion of the bumper beam 50. FIG. 2C is a cross sectional view corresponding to the above-described FIG. 4 and showing the vicinity of one of attached portions 52 that is fixed to the above-described crush box 14R. This bumper beam 50 is formed of a flat-sheet-shaped metallic material which has a tensile strength of 780 MPa or higher, for example, 980 MPa or higher and which is formed by a cold press forming to have a predetermined shape, or alternatively, formed of a flat-sheet-shaped metallic material for a hot press forming, which is formed to have a predetermined shape while being given an increased tensile strength of 1400 MPa or higher by the hot press forming. The bumper beam 50 is provided by an elongated member, and is integrally attached at its longitudinally opposite end portions to the right and left side members 12R, 12L through the respective crush boxes 14R, 14L, in the same manner as in FIG. 3. It is noted that the view of FIG. 2A shows an outline of the shape of the bumper beam 50 and that a thickness of the flat-sheet-shaped metallic material is not illustrated.

In the longitudinally central portion of the bumper beam 50, as is apparent from FIG. 2B, a pair of protruding portions 54 each protruding to have an inverted U shape are provided to be vertically spaced apart from each other, with a connecting portion 56 interposed between the pair of protruding portions 54, such that the longitudinally central portion as a whole has a M-shaped cross-sectional configuration. Vertically opposite end portions of the bumper beam 50 are provided by flat flanges 58 that are located on opposite sides of the pair of protruding portions 54. Each bent portion of the M-shaped cross section is bent to be relatively squared. Each of the pair of protruding portions 54 has a trapezoidal shape such that its width is reduced as viewed in a direction toward its distal end. The connecting portion 56 is straight, namely, provides a flat surface, and lies on a plane on which the flanges 58 also lie. The bumper beam 50 is disposed in the front portion of the vehicle such that the connecting portion 56 and the flanges 58 have substantially vertical attitudes. A horizontal direction in FIG. 2B corresponds to a vertical direction of the bumper beam 50 (or vehicle), and an upward direction in FIG. 2B corresponds to a forward direction of the vehicle.

A height H of the protruding portions 54 is gradually reduced as viewed in a direction away from the central portion toward each of the opposite end portions, while the connecting portion 56 is gradually displaced in a direction of protrusion of the protruding portions 54 as viewed in the direction away from the central portion toward each of the opposite end portions. In each of the attached portions 52 shown in FIG. 2C, the connecting portion 56 is displaced to a protruding position of a distal end of each of the protruding portions 54 so as to be flush with the distal end of each of the protruding portions 54, such that each of the attached portions 52 as a whole has an inverted plate-shaped cross-sectional configuration. The width of the entirety of the bumper beam 50 in each of the attached portions 52, namely, a dimension of the entirety of the bumper beam 50 as measured in a horizontal direction of FIG. 2C is substantially equal to the width of the entirety of the bumper beam 50 in the central portion shown in FIG. 2B. In a state in which the metallic material is flat before being subjected to the press working, the metallic material has a width which is maximized in its central portion and which is gradually reduced as viewed in the direction away from its central portion toward each of its opposite end portions.

With the crush box 14R being introduced inside the inverted plate-shaped cross-sectional configuration of the attached portion 52, a bottom portion 60 of the inverted plate-shaped cross-sectional configuration is fixed to the adapter plate 40 of the crush box 14R. That is, a width of inside of the inverted plate-shaped cross-sectional configuration of the attached portion 52 is larger than the width of the adapter plate 40 of the crush box 14R. The bottom portion 60 having the inverted plate-shaped cross-sectional configuration is provided by a flat surface, and is integrally fixed to the adapter plate 40 by means of bolts or the like (not shown), with the flat surface is held in close contact with substantially an entire surface of the adapter plate 40.

The inverted plate-shaped cross-sectional configuration has a height h enabling the attached portion 52 to have a bending strength higher than the crush strength of the crush box 14R while permitting the crush box 14R to be completely crushed. The height h of the inverted plate-shaped cross-sectional configuration is determined such that a spacing distance D between the flange 58 of the bumper beam 50 and another adapter plate 62 of the crush box 14R is made larger than a crush stroke that is required for the crush box 14R to be completely crushed before the flange 58 is brought into contact with the adapter plate 62. The crush stroke enabling the crush box 14R to be completely crushed is 70-75% of the length L of the crush box 14R, although it varies depending on the material and sheet thickness of the crush box 14R. It is enough that the height h is set at a value that permits the crush box 14R to be introduced inside the inverted plate-shaped cross-sectional configuration by a distance t smaller than 20% of the total length L of the crush box 14R. In the present embodiment, however, in order to assure the bending strength of the attached portion 52, the value of the height h is determined such that the above-described distance t is smaller than 25%. The adapter plate 62 is fixed integrally to the side member 12R, and functions as a structural member of the vehicle like the side member 12R. Upon contact of the flange 58 with the adapter plate 62, further compressive deformation of the crush box 14R is impeded.

Since the vehicle bumper beam 50 of the second invention is a product formed of the flat-sheet-shaped metallic material that is subjected to the press working to have the predetermined shape, it can be manufactured relatively inexpensively as compared with a case where a pipe is used or where a sheet material is formed into a closed cross-sectional configuration. Meanwhile, in its longitudinally central portion in which a high bending strength is required, the pair of protruding portions 54 are connected to each other through the connecting portion 56, so that the central portion has the M-shaped cross-sectional configuration, so as to be given a higher bending strength than a hat shape, thereby making it possible to reduce a weight of the bumper beam, by reducing the sheet thickness and the height H.

Further, the attached portion 52 fixed to the crush box 14R is configured to have the inverted plate-shaped cross-sectional configuration inside which a distal end portion of the crush box 14R is introduced so as to be fixed to the attached portion 52. The height h of the inverted plate-shaped cross-sectional configuration is a dimension enabling the attached portion 52 to have the bending strength higher than the crush strength of the crush box 14R while permitting the crush box 14R to be completely crushed, so that the attached portion 52 maintains the required bending strength while assuring the sufficiently crush stroke of the crush box 14R, thereby making it possible to obtain a sufficient impact-absorbing performance. In that case, the height H of the protruding portions 54 is gradually reduced as viewed in the direction away from the central portion toward each of the opposite end portions, and the connecting portion 56 is gradually displaced in the direction of the protrusion of the protruding portions as viewed in the direction away from the central portion toward each of the opposite end portions, thereby eliminating a risk of deterioration of the bending strength due to a stress concentration.

In the present embodiment, since the distal end portion of the crush box 14R is introduced inside the attached portion 52, it is possible to further increase the length L of the crush box 14R and accordingly further improve the impact absorbing performance, as compared with the above-described first embodiment. Further, it is possible to increase the roundness of the corner portions of the vehicle by rearwardly shifting the end portions of the bumper beam 50 toward the rear portion of the vehicle, while maintaining the impact-absorbing performance.

Further, in the present embodiment, the bumper beam 50 is formed of the flat-sheet-shaped metallic material which has the tensile strength of 980 MPa or higher and which is formed by the cold press forming, or alternatively, formed of the flat-sheet-shaped metallic material for the hot press forming, which is formed while being given an increased tensile strength of 1400 MPa or higher by the hot press forming. In either case, it is possible to increase a degree of freedom in designing the configuration while assuring the required bending strength. Owing to the increased degree of freedom in designing the configuration, the weight of the bumper beam can be further reduced by reducing the height values H, h or reducing the sheet thickness. This effect is further remarkable where the bumper beam 50 is formed of the metallic material for the hot press forming, whose strength is increased by the hot press forming.

The embodiments of the present invention have been explained in detail with reference to the drawings. However, the explained embodiments are merely embodied forms, and the present invention can be embodied with various modifications and improvements on the basis of knowledge of those skilled in the art.

The invention claimed is:

1. An elongated vehicle bumper beam which is formed of a metal sheet and which is to be attached at longitudinally opposite end portions thereof to respective side members of a vehicle through respective impact absorbing members, the bumper beam comprising:
   a pair of protruding portions protruding to define an inverted U-shape and elongated in a longitudinal direction of the bumper beam, and spaced apart from each other in a width direction of the bumper beam;
   a pair of flange portions formed at opposite portions in the width direction of the pair of protruding portions to extend outwardly; and
   a connecting portion interposed between the protruding portions and connecting the protruding portions, such that the connecting portion cooperates with the protruding portions to define a M-shaped configuration in a cross section of the bumper beam that is perpendicular to the longitudinal direction of the bumper beam,
   wherein a first width in the connecting portion is larger at adapting portions in longitudinally opposite ends to be fixed to the impact absorbing member than a second width at the longitudinally central portion,
   wherein the connecting portion has a third width as measured substantially in the width direction of the bumper beam, such that the third width gradually increases as viewed in a direction away from a longitudinally central portion of the bumper beam toward each of the longitudinally opposite end portions,
   and wherein each of the protruding portions has a height as measured substantially in a direction perpendicular to the longitudinal and width directions of the bumper beam, such that the height gradually reduces as viewed in a direction away from the longitudinally central portion toward each of the longitudinally opposite end portions.

2. The elongated vehicle bumper beam according to claim 1, wherein the metal sheet is bent into a predetermined shape by a press working to form the bumper beam having the pair of protruding portions and the connecting portion.

3. The elongated vehicle bumper beam according to claim 1, wherein the height of each of the protruding portions in the longitudinally opposite end portions is smaller than the height of each of the protruding portions in the longitudinally central portion, by an amount allowing the longitudinally opposite end portions to have a bending strength higher than a crush strength of the impact absorbing members.

4. The elongated vehicle bumper beam according to claim 1, wherein the metal sheet forming the bumper beam has a tensile strength that is not lower than 780 MPa.

5. An elongated vehicle bumper beam which is formed of a metal sheet and which is to be attached at longitudinally opposite end portions thereof to respective side members of a vehicle through respective impact absorbing members, the bumper beam comprising:
   a pair of protruding portions protruding to define an inverted U-shape and elongated in a longitudinal direction of the bumper beam, and spaced apart from each other in a width direction of the bumper beam; and
   a connecting portion interposed between the protruding portions and connecting the protruding portions, such that the connecting portion cooperates with the protruding portions to define a M-shaped configuration in a cross section of the bumper beam that is perpendicular to the longitudinal direction of the bumper beam,
   wherein each of the protruding portions protrudes to have a height as measured substantially in a direction perpendicular to the longitudinal and width directions of the bumper beam, such that the height is gradually reduced as viewed in a direction away from a longitudinally central portion of the bumper beam toward each of the longitudinally opposite end portions, and wherein the connecting portion is gradually displaced in a direction of protrusion of the protruding portions as viewed in the direction away from the longitudinally central portion toward each of the longitudinally opposite end portions, such that the connecting portion is flush with the protruding portions in each of the longitudinally opposite end portions, and such that each of the longitudinally opposite end portions has an inverted plate-shaped configuration in a cross section thereof that is perpendicular to the longitudinal direction of the bumper beam, at adapting portions in longitudinally opposite ends to be fixed to the impact absorbing member.

6. The elongated vehicle bumper beam according to claim 5, wherein the metal sheet is bent into a predetermined shape by a press working to form the bumper beam having the pair of protruding portions and the connecting portion.

7. The elongated vehicle bumper beam according to claim 5, wherein each of the longitudinally opposite end portions having the inverted plate-shaped configuration receives and fixes inside thereof a corresponding one of the impact absorbing members, and wherein each of the inverted plate-shaped configurations has a height enabling the longitudinally opposite end portions to have a bending strength higher than a crush strength of the impact absorbing members, while allowing the impact absorbing members to be completely crushed.

8. The elongated vehicle bumper beam according to claim 5, wherein the metal sheet forming the bumper beam has a tensile strength that is not lower than 780 MPa.

9. A process of manufacturing a vehicle bumper beam which is formed of a metal sheet and which is to be attached at longitudinally opposite end portions thereof to respective side members of a vehicle through respective impact absorbing members, the bumper beam having: (a) a pair of protruding portions elongated in a longitudinal direction of the bumper beam, and spaced apart from each other in a width direction of the bumper beam; and (b) a connecting portion interposed between the protruding portions and connecting the protruding portions, such that the connecting portion cooperates with the protruding portions to define a M-shaped configuration in a cross section of the bumper beam that is perpendicular to the longitudinal direction of the bumper beam, wherein each of the protruding portions protrudes to have a height as measured substantially in a direction perpendicular to the longitudinal and width directions of the bumper beam, such that the height is gradually reduced as viewed in a direction away from a longitudinally central portion of the bumper beam toward each of the longitudinally opposite end portions, the process comprising:

bending the metal sheet into a predetermined shape by a press working to form the bumper beam having the pair of protruding portions and the connecting portion;

wherein a first width in the connecting portion is larger at adapting portions in longitudinally opposite ends to be fixed at the impact absorbing members than a second width at the longitudinally central portion.

10. The process according to claim 9, wherein the press working is a hot press forming that is carried out with the metal sheet being heated, such that the metal sheet forming the bumper beam is given an increased strength by the hot press forming.

* * * * *